(12) United States Patent
Soukup et al.

(10) Patent No.: US 7,646,725 B1
(45) Date of Patent: Jan. 12, 2010

(54) SELF-HEALING CONTAINERS

(75) Inventors: Martin Soukup, Ottawa (CA); Stephen Gaito, Coventry (GB); Sergio Fiszman, Nepean (CA)

(73) Assignee: Nortel Networks Limited, St Laurent, Quebec (CA)

( * ) Notice: Subject to any disclaimer, the term of this patent is extended or adjusted under 35 U.S.C. 154(b) by 579 days.

(21) Appl. No.: 11/010,741

(22) Filed: Dec. 13, 2004

Related U.S. Application Data

(60) Provisional application No. 60/549,508, filed on Mar. 2, 2004.

(51) Int. Cl.
*H04L 12/26* (2006.01)

(52) U.S. Cl. ........................... 370/252; 455/423

(58) Field of Classification Search ................. 370/235; 455/406, 456; 709/203, 223, 227
See application file for complete search history.

(56) References Cited

U.S. PATENT DOCUMENTS

| | | | | |
|---|---|---|---|---|
| 5,907,602 A * | 5/1999 | Peel et al. ............. | 379/114.14 |
| 6,170,011 B1 * | 1/2001 | Macleod Beck et al. .... | 709/224 |
| 6,230,312 B1 * | 5/2001 | Hunt ..................... | 717/108 |
| 6,286,031 B1 * | 9/2001 | Waese et al. ............ | 709/203 |
| 6,340,977 B1 * | 1/2002 | Lui et al. ............... | 715/709 |
| 6,370,573 B1 * | 4/2002 | Bowman-Amuah ........ | 709/223 |
| 6,487,665 B1 * | 11/2002 | Andrews et al. ......... | 726/26 |
| 6,571,285 B1 * | 5/2003 | Groath et al. ............ | 709/223 |
| 6,584,508 B1 * | 6/2003 | Epstein et al. ........... | 709/229 |
| 6,725,048 B2 * | 4/2004 | Mao et al. ............... | 455/456.2 |
| 6,813,278 B1 * | 11/2004 | Swartz et al. ............ | 370/466 |
| 6,820,055 B2 * | 11/2004 | Saindon et al. ........... | 704/235 |
| 6,845,396 B1 * | 1/2005 | Kanojia et al. ........... | 709/224 |
| 6,934,756 B2 * | 8/2005 | Maes ..................... | 709/227 |
| 7,007,063 B2 * | 2/2006 | Creamer et al. .......... | 709/203 |
| 7,043,160 B1 * | 5/2006 | Graves .................... | 398/98 |
| 7,092,707 B2 * | 8/2006 | Lau et al. ................ | 455/423 |
| 7,330,717 B2 * | 2/2008 | Gidron et al. ............ | 455/418 |
| 7,343,605 B2 * | 3/2008 | Langkafel et al. ......... | 719/316 |
| 7,461,385 B2 * | 12/2008 | Winter ................... | 719/328 |
| 2002/0068545 A1 * | 6/2002 | Oyama et al. ........... | 455/406 |
| 2003/0172145 A1 * | 9/2003 | Nguyen .................. | 709/223 |
| 2003/0188001 A1 * | 10/2003 | Eisenberg et al. ........ | 709/229 |
| 2004/0054743 A1 * | 3/2004 | McPartlan et al. ........ | 709/206 |
| 2004/0223602 A1 * | 11/2004 | Honkasalo et al. ....... | 379/243 |
| 2005/0041584 A1 * | 2/2005 | Lau et al. ................ | 370/235 |

* cited by examiner

*Primary Examiner*—Thong H Vu
(74) *Attorney, Agent, or Firm*—Anderson Gorecki & Manaras LLP

(57) ABSTRACT

Performance of applications such as service capabilities in a container for providing a multimedia service is monitored. Performance monitoring indicates how well the applications are functioning in terms of predefined metrics and also whether the applications are functioning at all. Responses are prompted if performance monitoring indicates that an application is performing below a predefined level or failing to perform entirely. For example, a hung application may be restarted and other applications may alter their manner of function. This allows complex recovery logic through combinations of simple rules.

20 Claims, 2 Drawing Sheets

__US 7,646,725 B1__

SELF-HEALING CONTAINERS

CROSS-REFERENCE TO RELATED APPLICATIONS

A claim of priority is made to U.S. Provisional Patent Application Ser. No. 60/549,508 entitled Self Healing Containers, filed Mar. 2, 2004.

FIELD OF THE INVENTION

This invention is generally related to multimedia and telecommunications services, and more particularly to enhanced performance and reliability of those services.

BACKGROUND OF THE INVENTION

Architectures which enable end user sessions and associated invocation of multimedia services such as Push To Talk ("PTT"), video streaming and Voice over Packet are known. One example proposed by the $3^{rd}$ Generation Partnership Project ("3GPP") includes the 3GPP IP Multimedia Core Network Subsystem ("IMS") and 3GPP2 All IP Core Network Multimedia Domain ("MMD") which utilize Session Initiation Protocol ("SIP") Call Session Control Functions ("CSCF") components. A Serving CSCF ("S-CSCF") is operative to identify the multimedia services to which an end user has subscribed via a device such as a wireless phone, PDA or computer through a Proxy CSCF (P-CSCF), and provide means for invoking and controlling the runtime instances of services. User service interaction profiles are stored in a user profile database, which may be included in the Home Subscriber Service ("HSS") database. The S-CSCF analyzes the user service interaction profile and current session state to determine how to invoke and interwork services.

One or more component applications known as service capabilities are employed to provide each multimedia service. In particular, the service capabilities perform different functions which are coupled to provide the intended result of the multimedia service. The service capabilities for providing a multimedia service may be grouped in a container in order to facilitate operation. For example, the container may perform an interface function to provide a uniform Application Programming Interface ("API") if the individual service capabilities have disparate native interfaces. The container may also monitor state, i.e., whether the multimedia function of the container is operating or not. However, such basic state monitoring is not particularly useful for achieving high reliability or providing compliance with Service Level Agreements ("SLAs") in accordance with evolving industry conditions and demands.

SUMMARY OF THE INVENTION

In accordance with the present invention performance and errors of applications such as service capabilities in a container for providing a multimedia or other services is monitored. Performance monitoring indicates how well the applications are functioning in terms of predefined metrics. Performance monitoring may also indicate whether the applications are functioning at all. Remedial action may be prompted if performance monitoring indicates that an application is performing below a predefined level or failing to perform entirely. The predefined level, which may correspond to a Service Level Agreement ("SLA"), may be automatically specified by a service capability, application server, or other network component. Remedial actions may include, for example, restarting a hung application or transferring capabilities to another running instance if dependent applications require immediate service. These actions may be dictated by financial consideration. The remedial actions may be quite complex and depend on multi-leveled thresholds of parameters that do not cross SLAs.

A management agent may be employed to implement performance monitoring of the applications of a particular container. One embodiment of the management agent monitors performance to determine whether a performance level, such as specified in a SLA, is met. Another embodiment of the management agent facilitates provision of services in accordance with the level specified by the SLA by prompting remedial actions.

One advantage of the invention is that reliability of multimedia services is enhanced. Because performance is monitored at the application level, the source of problems is identifiable with greater specificity. Further, because performance is monitored it may be possible to prompt remedial actions before a complete failure of the multimedia service occurs. Reliability is also enhanced because performance metrics are computed relative to each application rather than solely mapping local behavior to global SLA attributes in the application.

Another advantage of the invention is that compliance with SLAs is facilitated. As the provision of multimedia services evolves to rely upon components maintained by different business organizations, overall performance of a multimedia service becomes dependent upon the ability of those business organizations to meet SLAs. Because performance is monitored at the application level, a provider of a particular application may have earlier indication of a problem, and failure to meet SLA requirements may be easily traced to the provider of a particular application. For example, the container has information regarding dependencies between applications and service capabilities, and also the states of those applications and service capabilities. Consequently, timely switching of providers to meet SLA requirements being offered to a subscriber or other service provider is facilitated.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
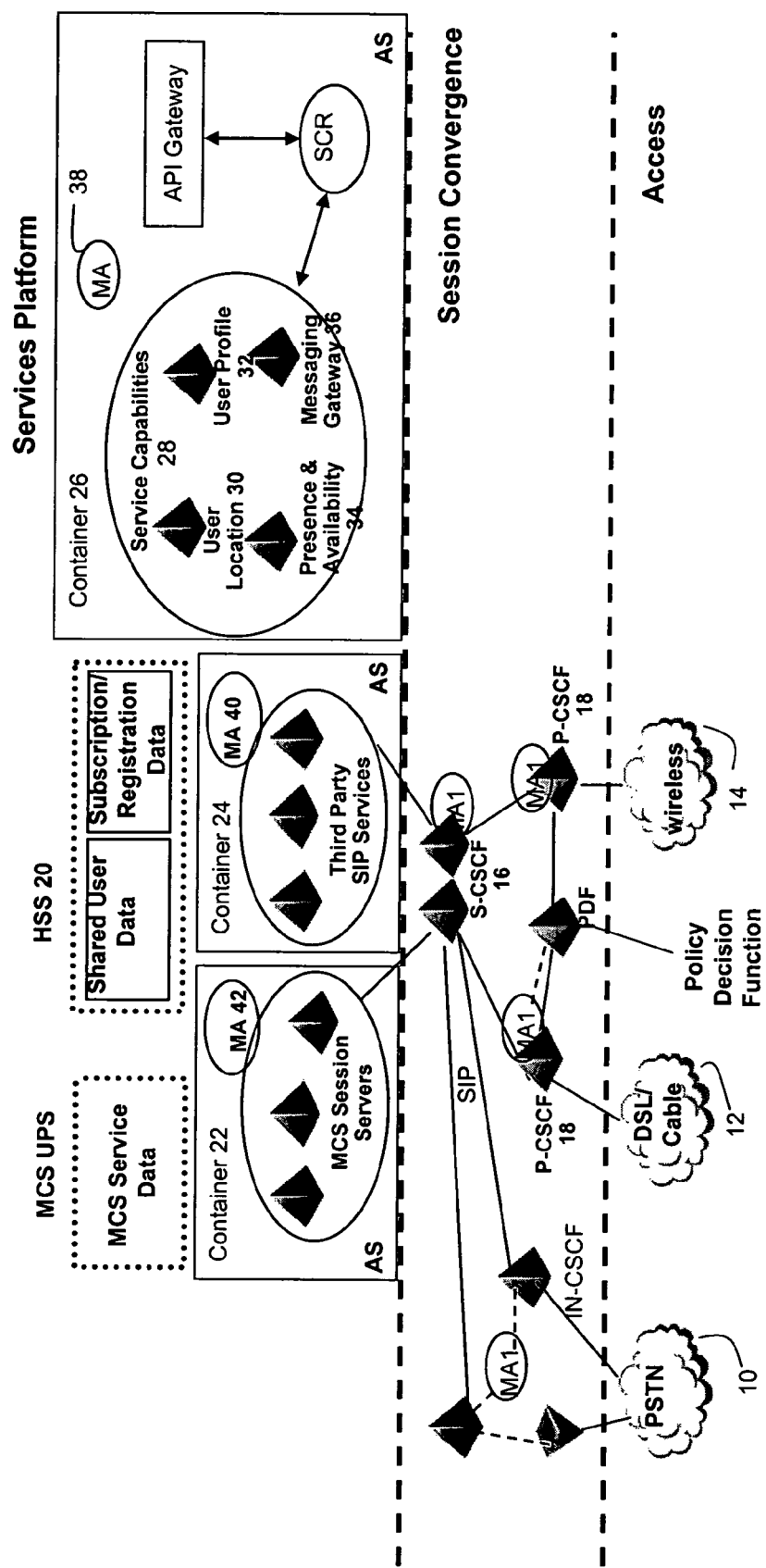
FIG. 1 is a block diagram of a network in which management agents monitor performance and other metrics of applications associated with a container.

FIG. 1 illustrates a network architecture for providing multimedia services via access technologies such as the Public Switched Telephone Network ("PSTN") 10, broadband 12 such as Digital Subscriber Line ("DSL") and cable, and wireless access 14. A Serving CSCF ("S-CSCF") 16 is operative to identify the multimedia service to which an end user has subscribed via a subscriber device through an intermediary CSCF such as Proxy CSCF (P-CSCF) 18. The S-CSCF also invokes a runtime instance of identified multimedia service in the application server ("AS"). User service interaction profiles are stored in a user profile database, which may be included in the Home Subscriber Service ("HSS") database 20. The S-CSCF analyzes the user service interaction profile and current session state to determine how to invoke and interwork services from ASs.

Runtime instances of multimedia services are provided by containers 22, 24, 26, which are ASs. In particular, each container represents at least one service capability which comprises at least one runtime instance of a particular multimedia service, i.e., each runtime instance may be associated with multiple service capabilities, and the container may represent multiple runtime instances of a service, and even multiple services. Each container includes one or more component applications such as service capabilities 28 which operate together to provide the service or services. For example, container 26, which includes component service capabilities such as user location 30, user profile 32, presence & availability 34, and a messaging gateway 36, contains multiple multimedia services with multiple, potentially different, runtime instances.

In order to facilitate meeting negotiated agreements for the multimedia services associated with the container 26, performance of the component applications are individually monitored. Performance monitoring indicates how well each application is functioning in addition to whether the applications are functioning at all. The use of the term performance here encompasses a variety of state and behavioural information which is not limited to measuring of a timed or time sensitive characteristic. For example, performance monitoring could indicate metrics such as the response time, packet loss, jitter and the throughput rate of each component application. The particular metric or metrics most useful for a particular service capability 28 is at least in-part dependent on and tailored to the function performed by the service capability. The performance monitoring functions are implemented by a management agent 38, 40, 42. In particular, each management agent is employed to monitor behaviour (e.g. performance, state, failures, usage and security patterns) of the applications of a particular container, e.g., management agent 38 monitors service capabilities 28.

Figure 2:
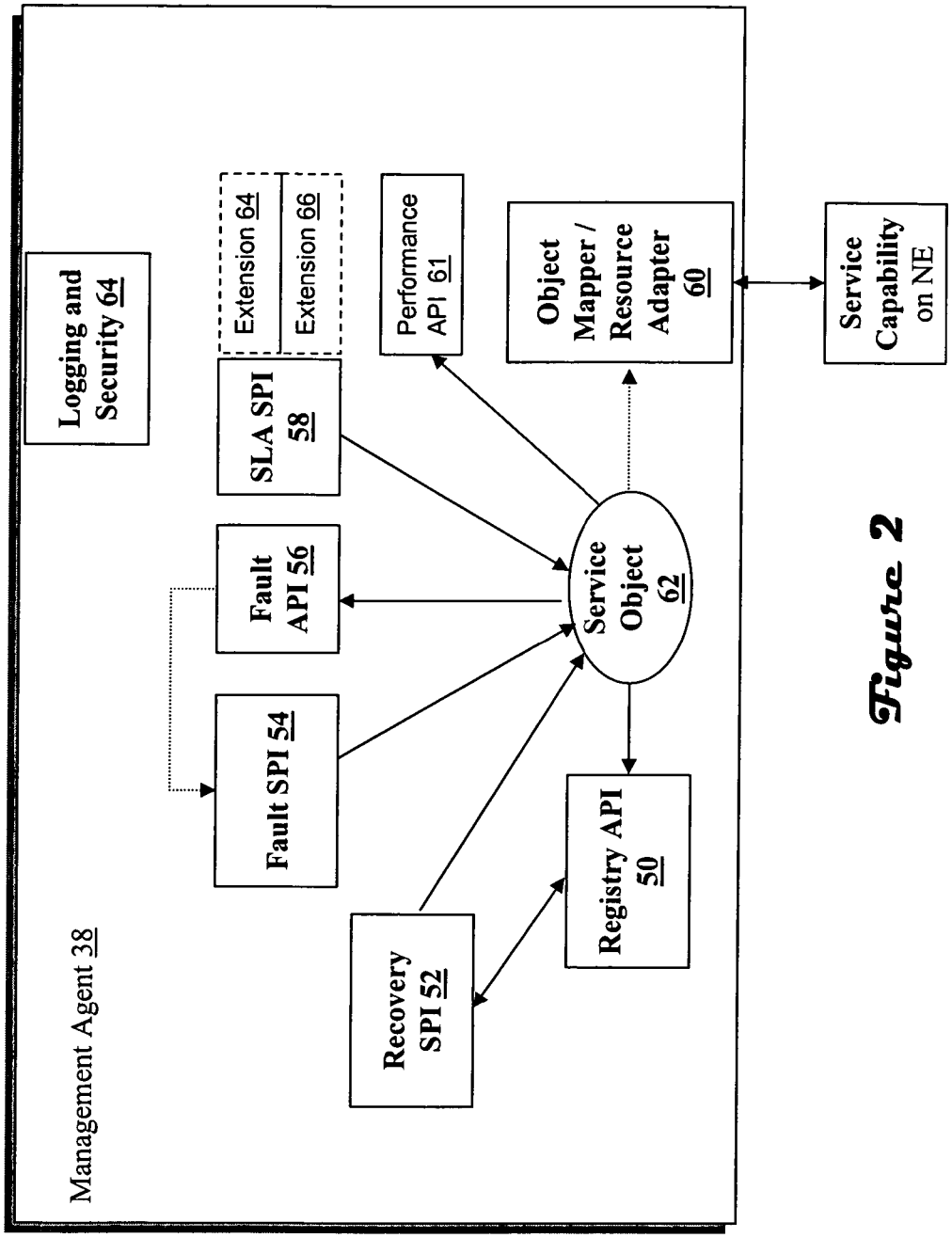
FIG. 2 is a block diagram of a container, illustrating components of a management agent.

FIG. 2 illustrates components of the management agent. In particular, the management agent may include a registry API 50, a recovery SPI 52, a fault SPI 54, a fault API 56, a SLA SPI 58 and an object mapper 60 and performance API 61.

The Service Level Agreement ("SLA") Service Provider Interface ("SPI") 58 is a management agent interface that a service capability may implement in order for the container 26 to attempt to instantiate that service capability with monitoring of negotiated SLA attributes. Performance metrics may then be collected directly by the container or they may be provided by the service object 62 via the performance API which is coordinated and managed by the management agent components. Invocation includes identification of performance attributes expressed in any form phrased in the context of attributes which the component supports (negotiation of SLA). The form of the expression has significance insofar as management agents may be $3^{rd}$ party provided, e.g., the CSCF, AS, MA, services may be provided by different corporate entities so the expression may need to be comprehensible to the management agents of different corporate entities. Performance of attributes which the container 26 can measure without component intervention, such as number of threads used, need not involve the Performance-API 61, and thus do not require invocation of the Performance-API by the service capability to achieve this functionality. SLA negotiation through the SLA-SPI may be based on WSLA or another relevant standard. Hence, the management agent can support monitoring of any particular selected or calculated performance metrics which may be desired by the service capability provider for maintaining adequate performance and providing an indication of compliance with agreements or guarantees between business organizations.

The SLA-SPI 58 may also include a component activation API extension 64 which processes requests for performance monitoring of other service capabilities. In particular, the extension 64 provides data regarding the performance of one or more service capabilities to some other service capability. The extension may be invoked with phrasing such that all performance attributes of interest to the requesting service capability can be algorithmically computed from attributes known to the container or understood by the used component itself. Hence, a service capability may adjust its performance in order to accommodate changes in performance of other service capabilities or even with changing application requirements.

The SLA-SPI 58 may also include an extension 66 through which a component may report on attributes which the component allows to be requested. Service capabilities need not report on performance attributes which can be detected by the container alone, but some performance attributes may be available only to the service capability. If such a performance attribute is desired by another service capability, device or business organization, request and provision of that performance attribute is supported by the SLA-SPI.

The Fault API 56 may be implemented to enable service capabilities to report failures which cannot be detected by the container 26 alone. The report of a failure by a component implies that the component itself and all subtending components are unable to remedy the situation. The Fault API may also be employed to report the failure of a service capability to meet predetermined performance metrics short of complete operational failure. The container may automate this failure reporting mechanism through machine learning mechanisms and information inherently available to the container. Applications may report non-performance degradations through this API as well (e.g. degradation of the accuracy of a calculation which is not in the SLA).

The Fault SPI 54 provides notification of subtending service capability failure, i.e., failure of dependencies. For example, when a failure is recognized by the container the failure is reported to the non-failing service capabilities and any other specified network devices and business organizations. Similarly, when a failure is reported via the Fault API, that failure is reported to the non-failing service capabilities and any other specified network devices and business organizations via the fault SPI 54. The Fault SPI may also be employed to report the failure of a service capability to meet predetermined performance metrics short of a complete operational failure, whether detected by the container or reported by the sub-component via the Fault API. In addition to triggering reporting activity, failures may trigger activation of recovery depending on the error type, severity, and specified recovery logic.

The Registry API 50 wraps the existing container registry mechanism, e.g., JNDI, or UDDI and may provide additional information about a component such as availability, a list of performance attributes, a list of dependencies, and other options such as "visible outside container." In some containers this can be implemented with deployment descriptors and auto-population of the registry. The Registry API may also support the registration of instance dependencies between components, if the container does not know this information by default, which may be used by components to register the components which they in turn utilize. Hence, information regarding availability, attributes and dependencies is available from a single source to facilitate configuration and operation.

The Recovery SPI 52 facilitates remedial actions in response to failure to meet performance targets and recovery from operational failures. The Recovery SPI includes information indicating how dependencies are managed during performance and operational failure. For example, the Recovery SPI provides a service capability with a list of valid and invalid dependent service capabilities. A success indicator implies continued operation of this dependency chain. A failure indicator causes the container to propagate failure to the next level of dependency (up the call-chain). The Recovery SPI functionality may be automated through machine learning mechanisms in the container.

The object mapper/resource adapter 60 is operative to translate communications between the management object, container and other network devices. In particular, the object mapper/resource adapter is operative to translate data between desired formats and translate instructions and semantics between protocols.

Performance and fault monitoring data as well as instantiation information may be stored for administrator browsing, troubleshooting and audit purposes. For example, a data logging and security component 64 may be implemented to store desired data. Data collection may be automated through machine learning mechanisms in the container. Data collection may also be integrated to billing systems by the container integration possibly with security (for instance RADIUS accounting interface supports accounting information about SO attributes) via the data logging and security component.

Because the management agent which implements the described components may itself be constrained by the described environment and failures, the management agent itself may be made self-healing. This can be implemented by employing a matched pair, i.e., implementing the same set of components, of recovering agents and each monitoring all of the service capabilities components and the matching recovery agent. Many well known techniques exist for this mechanism, such as master-slave. Note that the clustered deployment supported by most containers means that all the above described functionality may execute over distributed clusters.

In view of the description above, it will be understood by those of ordinary skill in the art that modifications and variations of the described and illustrated embodiments may be made within the scope of the inventive concepts. Moreover, while the invention is described in connection with various illustrative structures, those of ordinary skill in the art will recognize that the invention may be employed with other structures. Accordingly, the invention should not be viewed as limited except by the scope and spirit of the appended claims.

What is claimed is:

1. A method for providing a multimedia service based on a plurality of different component applications which are controlled by different vendors, perform different functions and operate together to form the multimedia service comprising the steps of:
    wrapping the different component applications which are controlled by different vendors and operate together to form the multimedia service in a container;
    monitoring individual performance of ones of the component applications such that function of one of the component applications at a level below a predetermined value is detected;
    generating a signal indicating which one of the component applications functioned below the predetermined value if function of one of the component applications at a level below the predetermined value is detected; and
    transmitting the signal to a different component application in the container.

2. The method of claim 1 wherein function below the predetermined value indicates a level of function greater than failure to function.

3. The method of claim 1 including the further step of managing component application dependencies if function of the application at a level below the predetermined value is detected.

4. The method of claim 1 wherein the monitoring step is performed at least in-part by the container.

5. The method of claim 1 wherein the monitoring step is performed at least in-part by the component application being monitored.

6. The method of claim 1 wherein the predetermine value is provided by the component application functioning at a level below the predetermined value.

7. The method of claim 1 wherein the predetermine value is provided by a different component application in the container.

8. The method of claim 1 including the further step of maintaining data indicative of component availability, performance attributes, and dependencies.

9. The method of claim 1 including the further step of maintaining data indicative of how dependencies are managed when function of the application is below the predetermined value.

10. The method of claim 9 including the further step of providing a service capability with a list of valid and invalid dependent service capabilities.

11. A computer readable medium having a computer program product operative to provide a multimedia service based on a plurality of different component applications which are controlled by different vendors, perform different functions and operate together to form the multimedia service comprising:
    a container application operative to wrap the different component applications which are controlled by different vendors and operate together to form the multimedia service; and
    a management agent operative to monitor performance of individual ones of the component applications such that function of one of the component applications at a level below a predetermined value is detected, the management agent further operative to generate a signal indicating which component application functioned below the predetermined value if function of the component application at a level below the predetermined value is detected, and to transmit the signal to a different component application in the container.

12. The product of claim 11 wherein function below the predetermined value indicates a level of function greater than failure to function.

13. The product of claim 11 wherein the management agent is operative to manage component application dependencies if function of the application at a level below the predetermined value is detected.

14. The product of claim 11 wherein performance monitoring data is provided at least in-part by the container.

15. The product of claim 11 wherein performance monitoring data is provided at least in-part by the component application being monitored.

16. The product of claim 11 wherein the component application functioning at a level below the predetermined value is operative to provide the predetermine value.

17. The product of claim 11 wherein a different component application in the container is operative to provide the predetermine value.

18. The product of claim 11 further including program code operative to maintain data indicative of component availability, performance attributes, and dependencies.

19. The product of claim 11 further including program code operative to maintain data indicative of how dependencies are managed when function of the application is below the predetermined value.

20. The product of claim 19 further including program code operative to provide a service capability with a list of valid and invalid dependent service capabilities.

\* \* \* \* \*

UNITED STATES PATENT AND TRADEMARK OFFICE
CERTIFICATE OF CORRECTION

| | |
|---|---|
| PATENT NO. | : 7,646,725 B1 |
| APPLICATION NO. | : 11/010741 |
| DATED | : January 12, 2010 |
| INVENTOR(S) | : Soukup et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1010 days.

Signed and Sealed this

Sixteenth Day of November, 2010

David J. Kappos
*Director of the United States Patent and Trademark Office*